Figure 1:
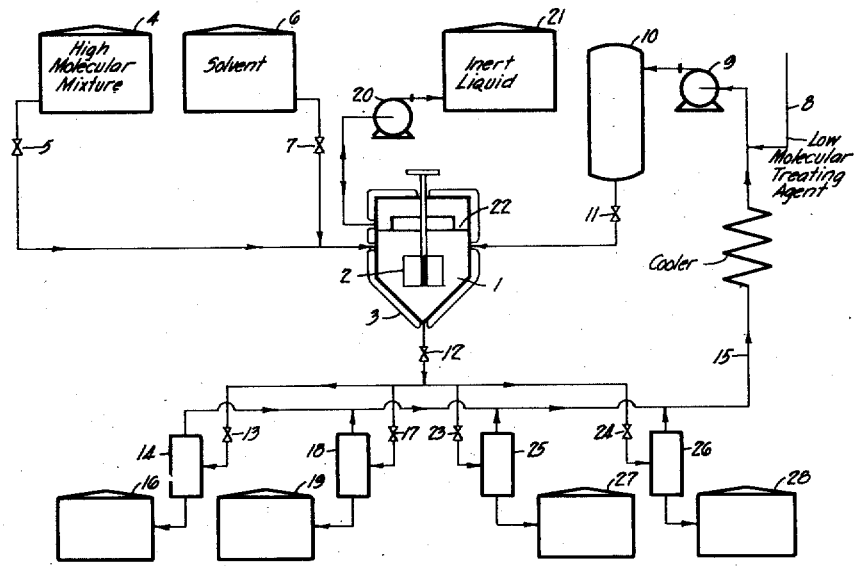

May 24, 1938. A. SCHAAFSMA 2,118,454

PROCESS FOR SEPARATING HIGH MOLECULAR MIXTURES OF THE ESTER TYPE

Filed March 24, 1936

Inventor: Albert Schaafsma

By his Attorney:

Patented May 24, 1938

2,118,454

UNITED STATES PATENT OFFICE 2,118,454

PROCESS FOR SEPARATING HIGH MOLECULAR MIXTURES OF THE ESTER TYPE

Albert Schaafsma, Amsterdam, Netherlands, assignor to Shell Development Company, San Francisco, Calif., a corporation of Delaware Application March 24, 1936, Serial No. 70,596 In the Netherlands March 30, 1935

13 Claims. (Cl. 87—12)

This invention relates to improvements in the method of separating mixtures of high molecular substances, such as animal fats and oils, vegetable oils and waxes, and similar mixtures of non-hydrocarbon organic substances, or mixtures of high molecular hydrocarbons with high molecular non-hydrocarbon substances into fractions having different compositions. The initial mixture to be separated should be liquid at the temperature of the treatment, or be capable of being dissolved in a suitable solvent.

A number of methods employing various solvents is known for effecting the separation of high molecular mixtures, such as hydrocarbon oils, into several portions of different compositions. Thus, it is known to effect the separation of substances in the solid state, e. g. asphaltic or resinous substances, as well as paraffin wax, from hydrocarbon oils by dissolving the oil in a liquid precipitant for the solid substances, such as liquefied butane, ethane, and the like either at ordinary or reduced temperatures.

It is, moreover, known to effect the fractionation of high molecular hydrocarbon mixtures by adding methane, or ethane to the hydrocarbon mixture or to the solution of the hydrocarbon mixture in suitable solvents, whereby the density of the mixture is lowered, and the high molecular mixture is caused to separate into two liquid phases of different specific gravities. The successive fractionation of the mixture is, in this type of process, effected by introducing more gas into the mixture or into a lighter liquid phase which was formed in a previous stage.

It is an object of the present invention to separate mixtures of high molecular organic non-hydrocarbons, or mixtures of high molecular organic non-hydrocarbons and high molecular hydrocarbons into two or more fractions having different molecular weights and/or internal pressures with the aid of a low molecular treating agent by selectively precipitating certain components of the initial mixture from a solution containing the mixture and the treating agent.

Briefly, the process according to the present invention comprises the steps of commingling the mixture of high molecular substances, or a solution of the mixture in a suitable solvent, with a low molecular treating agent, heating the resulting mixture to a temperature at which the low molecular treating agent is in its paracritical state at a constant or increasing pressure sufficient to cause at least a major portion of the treating agent to have a density greater than its critical density, thereby lowering the density of the treating agent and causing the formation of a lighter liquid phase and a heavier phase, which may be either liquid or solid. The heating is controlled so that each of these phases contains a portion or fraction of the initial mixture. These phases are then separated by any physical means, such as settling and decantation, or centrifuging, without changing their compositions. After the separation of the heavy phase, the temperature of the remaining phase may again be raised, at constant or increasing pressure, with or without the further addition of low molecular treating agent.

The initial mixture and the treating agent may be commingled at any desired pressure, and the low molecular treating agent may be introduced either in a gaseous or liquid state. In the latter case, at the initial temperature, all of the high molecular mixture may be dissolved in the treating agent; but in some cases a portion of the mixture will at first be insoluble in the liquid low molecular treating agent, and it is desirable to separate the insoluble substances from the solution before heating. In the present specification and claims a phase having a density greater than the critical density of the low molecular treating agent is designated as "liquid", and a phase having a lower density is designated as a "gas".

My process is based on the following considerations: the "dissolving capacity" of low molecular substances with regard to high molecular substances depends upon the density of the former, in the sense that the less the density, i. e. the number of molecules per unit volume multiplied by the weight of one molecule, the less the "dissolving capacity". On the other hand, the solubility of the high molecular substances in the "liquid" low molecular treating agent decreases with increasing molecular weight of the high molecular substances. Thus, if it is possible sufficiently to reduce the density of such a treating agent in which a high molecular mixture is dissolved, the high molecular mixture will separate into two liquid or non-gaseous phases, provided that the temperature is not too high. The heavier of these phases will contain the high molecular substances which have now become "insoluble" and the other will be a solution of the lower molecular substances of the high molecular mixture in the treating agent. These liquid phases may be separated in any suitable manner. After this separation, the density of the low molecular treating agent in the lighter liquid phase may again be reduced by a further increase of the temperature, whereby the mixture is again caused to separate into two non-gaseous phases of different specific gravities. By repeating this treatment on successive light liquid phases in a series of steps, and using progressively higher temperatures, the high molecular mixture may be fractionated into any desired number of fractions having different properties.

I have found that by increasing its temperature it is possible to vary the density of the treating agent to a degree sufficient to effect the above stated separations when operating at temperatures in the proximity of the critical temperature of the treating agent, in view of the fact that at these temperatures a relatively small increase in the temperature will cause an appreciable decrease in the density of the "liquid" treating agent.

In the present specification and claims a substance near its critical temperature, at, or above its critical temperature, is designated as being in its "para-critical state". The lowest temperature at which a low molecular substance may be regarded as being in the para-critical state, i. e. the lower limit of the useful operating temperature range, depends upon the nature of the low molecular substance, and upon the solubility of the various components of the initial mixture therein, but generally lies between the critical temperature and the temperature of maximum solubility, i. e. the temperature above which a rise in the temperature of the low molecular treating agent in the liquid state under its own vapor pressure is accompanied by a decrease in its solvent power for the high molecular substances. In general, a substance is in its para-critical state when its temperature is not more than about 30° C. to 60° C. below its critical temperature, or is at or above its critical temperature, although these limits are not rigid and may in certain cases be exceeded. The upper limit of the useful operating temperature is generally determined by the considerations that the high molecular substances must not undergo decomposition, and that at greatly elevated temperatures the high molecular substances are more highly miscible with one another, and their demixing at excessively high temperatures is impossible. The highest temperature is, therefore, preferably low enough to cause the high molecular substances to be in their "normal liquid state", i. e. to be at a temperature below their para-critical temperature. It must not exceed the critical temperature of the combined mixture of high molecular substances and treating agent.

Further, it is advantageous to operate under the lowest pressures possible, without, however, operating at pressures which are so low that an increase in the temperature merely results in the evaporation of the treating agent, without the consequent expansion of the solution containing the latter. A slight evaporation of the gaseous treating agent may, however, occur, provided that the density of the unevaporated portion of the treating agent is effectively lowered to cause the desired separation of the high molecular mixture into two liquid phases. Consequently, if the danger of undesired evaporation arises, the pressure is raised, preferably simultaneously with the heating, so that at most only a small quantity of gas phase is present. Thus, in that case, the treatment is carried out orthobarically.

The quantity of the low molecular treating agent which must be in the liquid phase depends upon the relative solubilities of the components of the high molecular mixture, and upon the compressibility of the treating agent at the temperature of operation. In most cases from two to ten parts by weight of the low molecular treating agent to one part by weight of the dissolved high molecular mixture are suitable, although these limits may in certain cases be exceeded.

As a low molecular treating agent I may employ any low molecular substance which may be brought into solution with the high molecular mixture under super-atmospheric pressure, in its para-critical state. Moreover, any low molecular substance which may be brought more readily into solution with the high molecular mixture at the stated conditions by the aid of a mutual solvent may be employed. It is necessary to choose a low molecular treating agent with a low enough critical temperature to permit the process to be operated at temperatures which will not cause the decomposition of the high molecular substances, and will not prevent the formation of two non-gaseous phases, since a rise in temperature is generally accompanied with a corresponding increase in the miscibility of the components of the high molecular mixture. In view of these requirements I prefer to employ low molecular substances having critical temperatures below 250° C. Examples of suitable low molecular treating agents are: methane, ethane, propane, normal- or iso-butane, normal- or iso-pentane, natural gas, dry natural gas, ethylene, acetylene, ethyl chloride, dichlordifluor methane, methylene fluoride, dimethyl ether, methyl ethyl ether, dimethyl amine, hydrogen chloride, sulfur dioxide, sulfur trioxide, carbon dioxide, carbon monoxide, ammonia, hydrogen, and helium, and similar low molecular substances and mixtures thereof. The treating agent is preferably not reactive with the high molecular mixture under the conditions of the treatment, the separation being of a physical and not a chemical type.

The high molecular mixture may also be treated in the presence of an added solvent which improves its solubility in the treating agent, or which is effective to change the character of the fractions produced. Thus, the mixture may be first dissolved in such liquid solvents as propane, propylene, butane, hexane, light straight run naphthas and other light fractions of mineral oil. Alternatively, or in conjunction with the above hydrocarbon solvents, a solvent from the group of solvents known as selective solvents for naphthenic (or aromatic) hydrocarbons may be employed. Examples of these are: sulfur dioxide (at temperatures below para-critical, i. e. below about 100° C.), furfural, nitrobenzene, BB' dichloroethyl ether, cresylic acid, phenol aniline, quinoline, and a large number of others, their mixtures, or their solutions with diluents. These solvents may be added either initially, or at an intermediate stage in the process.

The added solvent should preferably have a critical temperature higher than that of the low molecular treating agent. Thus, when propane is used as the low molecular treating agent, butane or a higher boiling solvent should be employed as the added solvent; and when $SO_2$ is used as the added solvent, methane, ethane ethylene or carbon dioxide is preferably used as the treating agent.

Figure 2:
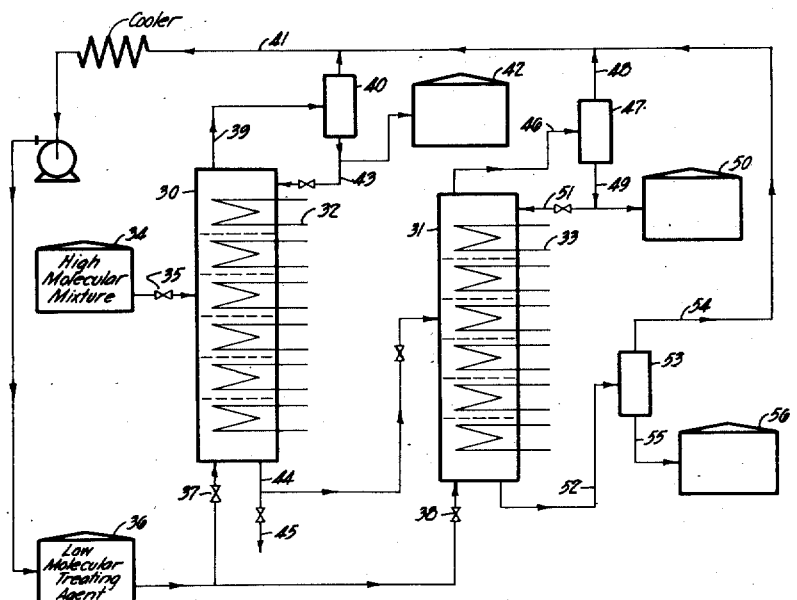

The process may, for example, be carried out in the apparatus shown in the accompanying drawing, in which Figure 1 is a schematic flow diagram of one form of apparatus suitable for practicing my invention, and Figure 2 is a similar diagram of another form of apparatus.

Referring to Figure 1, 1 is a treating vessel, adapted to contain the mixture undergoing treatment under the requisite temperature and pressure, and provided with a stirring apparatus 2 and with means for controlling the temperature, such a coil, or a jacket 3, as shown, constructed to receive a heating or cooling fluid. The high molecular mixture is fed into the vessel 1 from a tank 4 through a valve 5. If desired, an added solvent may be introduced from a tank 6 through a valve 7. A low molecular treating agent is introduced through a conduit 8, pump 9, pressure tank 10, and valve 11. The treating agent may be introduced either in the liquid or gaseous state, depending on the temperature and pressure, but after the temperature is raised as described below, the conditions in the vessel 1 are such that at most a very small quantity of the treating agent is present as a separate gas phase. The valve 11 is then closed, and the substances are mixed with the aid of the stirring apparatus 2. After mixing, the solution is allowed to remain quiescent, and the undissolved substances, if any, allowed to settle from the liquid solution of high molecular substances and treating agent to the lower conical portion of the vessel, from which they may be removed through the valves 12 and 13 to a separating apparatus 14, in which the entrained treating agent is removed from the undissolved substances, preferably by expanding the treating agent in its paracritical state at an elevated pressure to precipitate high molecular substances therefrom, if desired, through the application of heat, and returned to the tank 10 through a conduit 15, the undissolved substances being led to tank 16.

The solution remaining in the tank 1 is then heated at constant or increasing pressure, e. g. under its own vapor pressure, to a temperature at which the mixture separates into two non-gaseous phases. The heavier phase is then drawn off at a constant temperature by opening the valve 12, and fed through a valve 17 into separating apparatus 18, which may be similar to the apparatus 14, in which the pressure of the withdrawn phase is reduced, and the treating agent separated, the heavy fraction being fed to the tank 19.

After the withdrawal of the above described heavy phase, the valve 12 is closed, and the temperature again raised under the conditions already described causing a further expansion of the solution remaining in the tank 1, and a further separation of the mixture into two phases. In this manner successive heavy fractions are drawn off through the valves 23 and 24, freed from the propane in the apparatus 25 and 26, and led to storage tanks 27 and 28, it being understood that any number of fractions may be produced by regulating the size of the temperature increments. Most of the treating agent will remain in the lighter phases, the last one of which is similarly withdrawn as the last fraction. If a solvent from the tank 6 has been employed, the apparatus 14, 18, 25 and 26 may be operated to separate the solvent as a separate product, or, if desired, separate distillation units may be provided.

Instead of opening and closing the valve 12 at each stage of the process, the mixture can be heated and the heavier phase drawn off continuously, the product leaving the vessel being after proper time intervals led to the different storage tanks by manipulating the valves 13, 17, 23 and 24, in a manner similar to distillation.

The pressure may be further controlled by introducing additional quantities of treating agent, or by the aid of a piston, or by introducing or withdrawing an inert liquid which is immiscible with the substances being treated, e. g. water, mercury and the like. This inert liquid may, for example, be forced into the vessel 1 by means of a pump 20, connected to a reservoir 21, a trough 22 being provided in the vessel 1 for receiving the liquid.

The above process can also be carried out continuously by providing a series of treating vessels, similar to the vessel 1, and flowing the lighter phase from each vessel into the next vessel in the series. In this mode of operation the process is preferably carried out at a constant pressure, although increasing pressures may be employed by providing pumps between adjacent treating vessels.

One preferred mode of operating the process continuously is illustrated in Figure 2, in which 30 and 31 represent contact towers, provided with temperature insulating means and with heating coils 32 and 33, by means of which the temperature in the tower may be progressively increased from the bottom to the top. The towers may be packed with contacting means. A high molecular mixture is continuously fed from the tank 34 through a valve 35 to the top or to an intermediate point in the tower, and a low molecular treating agent from the tank 36 is fed through the valve 37 into the bottom of the towers.

In the tower 30 the high molecular mixture is partly dissolved in the treating agent, the components having the higher molecular weights and/or higher internal pressures flowing downwardly countercurrently to the treating agent, and the components having lower molecular weights and/or lower internal pressures being dissolved in the treating agent, which is under a sufficient pressure to be in the "liquid" state, i. e. to have a density greater than its critical density. The temperature is adjusted so that there are two non-gaseous phases at all points in the column, the solvent power of the treating agent being highest near the bottom of the tower, and lowest near the top. The treating agent, together with the dissolved substances, are withdrawn at 39 and are treated in a still 40, wherein the treating agent is separated from the high molecular substances, the former being condensed and returned to the tank 36 through a conduit 41, and the latter being condensed and collected in a tank 42. If desired, the fractionation may be improved by returning a portion of the recovered high molecular substances to the top of the tower through a conduit 43.

The insoluble components of the mixture, together with a small amount of treating agent, are withdrawn from the tower at 44 and may be withdrawn at 45 as a product, or may be further fractionated by being introduced into the tower 31 at an intermediate point. This tower may be operated at the same pressure as the tower 30, or at a different pressure, the same or a different treating agent being introduced at the bottom through a valve 38. The pressure and temperature in the tower 31 are preferably such that the solvent power of the treating agent near the point at which the mixture is introduced is at least as great as that near the bottom of the tower 30.

A similar fractionation is effected in the tower 31, and the treating agent, together with dissolved material is withdrawn at 46, and separated in the still 47, the treating agent being withdrawn at 48 and the dissolved substances at 49. The dissolved substances produced at 49, constitute an intermediate product, and may be run off to the tank 50. If desired, the fractionation in the tower 31 may be improved by returning a portion of the intermediate product through a conduit 51.

The insoluble components of the mixture, together with a small amount of the treating agent, are withdrawn from the tower at 52 and similarly separated in the still 53, the treating agent being withdrawn at 54 and the insoluble material being withdrawn at 55 and fed to the tank 56.

As compared with distillation, the process according to this invention has the great advantage that high boiling mixtures can be split up into fractions without danger of cracking. It is even possible to obtain very high molecular fractions, which cannot be obtained by usual distillation because of the simultaneous cracking of these components.

My process can, if desired, be combined with other processes usually employed to effect the separation of mixtures, such as chemical refining, distillation, extraction, dewaxing, etc.

As further examples of mixtures of high molecular substances which can be separated according to my process, may be mentioned mixtures of polymerized fatty oils, e. g. volatilized rapeseed oil, and mixtures of esters of fatty acids.

My invention may be further understood from the following examples:

I. Twelve parts of a mixture of mineral oil and volatilized rapeseed oil were mixed in 88 parts of a mixture of 96.6% butane and 3.4% propane and heated; at 56° C. demixing occurred. The following fractions were obtained by continuing the heating orthobarically:

| | Yield in percent by weight | Spec. grav. $d_4^{25}$ | Refractive $n_d^{20}$ | Viscosity °$E_{50}$ |
|---|---|---|---|---|
| Original oil | 100 | 0.9313 | 1.5025 | 150.1 |
| 1st fraction at 91° C | 17.4 | 0.9391 | 1.5005 | >6000 |
| 2nd fraction at 97.5° C | 12.6 | 0.9326 | 1.5020 | 191.4 |
| 3rd fraction at 106.0° C | 15.6 | 0.9302 | 1.5022 | 88.3 |
| 4th fraction at 115.0° C | 24.5 | 0.9268 | 1.5032 | 27.7 |
| 5th fraction at 121.0° C | 17.4 | 0.9257 | 1.5031 | |
| 6th fraction at 132.0° C | 5.4 | 0.9267 | 1.5031 | 23.3 |
| Residue | 7.1 | | | |

While the separation effected by my process is mainly on the basis of molecular weight, and is for this reason analogous to distillation, I have found that the compositions of the several fractions produced are not exactly the same as fractions produced by distillation. Thus, when treating a mixture of substances of about the same molecular size, the heavier fractions produced by my process generally contain the substances having the higher internal pressures.

II. Volatilized olein was dissolved in such a quantity of butane that a solution of about 13% olein in butane is formed. By heating the solution under its own vapor pressure various fractions of decreasing molecular weight were separated, as shown in the table herebelow:

| Fractions | Yield in percent by weight | Spec. grav. $d_4^{25}$ | Viscosity °$E_{50}$ |
|---|---|---|---|
| Base material | 100 | 0.939 | 66 |
| At 106° C | 33 | 0.957 | 365 |
| At 130° C | 33 | 0.947 | 132 |
| At 155° C | 30 | 0.920 | 19.6 |

III. 10 parts by weight of stand-oil were dissolved in 90 parts by weight of dimethyl ether (critical temperature 127° C.). By heating the solution under its own vapor pressure at 105° C. a fraction was separated which, after removal of the solvent, appeared to have a quicker drying power than the original stand-oil. The properties of this fraction, which was obtained in a yield of 35% by weight of the original oil, were as follows:

$$d_4^{25}=0.984, \; n_d^{20}=1.497.$$

The fraction remaining in solution (65% by weight of the original oil) after removal of the solvent had the following properties:

$$d_4^{25}=0.953, \; n_d^{20}=1.489.$$

The original stand-oil had a $$d_4^{25}=0.963 \text{ and } n_d^{20}=1.492.$$

As used in the present specification and claims, the term "mixture" is used to designate any state of aggregation, whether homogeneous or heterogeneous, while the term "solution" is used to designate a substantially homogeneous phase.

I claim as my invention:

1. A process for separating a high molecular mixture containing high molecular compounds containing at least one member of the class consisting of ester type fats, oils and waxes into portions having different properties, comprising the steps of dissolving said mixture in a quantity of a liquid low molecular treating agent to produce a liquid phase, said treating agent being non-reactive with said mixture and capable of dissolving a component of the mixture when the treating agent is in its para-critical state and precipitating another component, heating said liquid phase to a temperature at which the high molecular compounds are not chemically altered and at which the treating agent is in its para-critical state under a pressure not substantially less than the vapor pressure of the liquid phase, thereby causing the precipitation of a portion of the mixture and the formation of a separate heavier phase, and separating the heavier phase from the lighter liquid phase.

2. The process according to claim 1 in which the temperature is increased at a non-decreasing pressure.

3. The process according to claim 1 in which the temperature is increased under the vapor pressure of the mixture.

4. The process according to claim 1 in which the high molecular mixture is a mixture of hydrocarbons and non-hydrocarbons.

5. The process according to claim 1 in which the initial mixture contains a polymerized oil of the glyceride type.

6. A process for separating a high molecular mixture containing high molecular compounds containing at least one member of the class consisting of ester type fats, oils and waxes into portions having different properties, comprising the steps of commingling said oil with a low molecular treating agent having a critical temperature not higher than about 250° C. and being non-reactive with said mixture and capable of dissolving a component of the mixture when the treating agent is in its para-critical state and precipitating another component having a relatively higher internal pressure than said dissolved component, bringing the temperature of said mixture and treating agent to a temperature at which the latter is in its para-critical state, thereby forming a first light liquid phase containing soluble portions of the mixture and a major portion of the treating agent and a first heavier phase, separating said first phases, heating the separated lighter liquid phase to a higher temperature at which the high molecular compounds are not chemically altered to cause the precipitation of a part of the soluble portion dissolved therein and the formation of a second light liquid phase and a second heavier phase, and separating the second phases, the pressure being not substantially less than the vapor pressure of the liquid phase.

7. The process according to claim 6 in which the initial mixture contains a polymerized oil of the glyceride type.

8. A process for separating a high molecular mixture containing high molecular compounds containing at least one member of the class consisting of ester type fats, oils and waxes into portions having different properties, comprising the steps of dissolving said mixture in a quantity of a liquid low molecular treating agent to produce a first liquid phase, said treating agent being non-reactive with said mixture and capable of dissolving a component of the mixture when the treating agent is in its para-critical state and precipitating another component, heating said liquid phase to a temperature at which the high molecular compounds are not chemically altered and at which the treating agent is in its para-critical state, thereby precipitating a portion of the dissolved mixture and forming a secondary light liquid phase and a secondary heavier phase, separating the secondary phases, further heating the separated lighter secondary phase to cause the precipitation of a portion of the high molecular mixture dissolved therein and the formation of a tertiary light liquid phase and a tertiary heavier phase, and separating the tertiary phases, the pressure being not substantially less than the vapor pressure of the liquid phase.

9. The process according to claim 8 in which the heating is carried out continuously and the precipitated phase is continuously removed from the liquid phase during the heating.

10. A continuous process for separating a high molecular mixture containing high molecular compounds containing at least one member of the class consisting of ester type fats, oils and waxes, into portions having different properties, comprising the steps of flowing said mixture through a contact zone countercurrently to a liquid low molecular treating agent which, in its para-critical state, is non-reactive with said mixture and capable of dissolving a component of the mixture and precipitating another component thereof, increasing the temperature of said treating agent in its direction of flow, the treating agent being in its para-critical state at at least one point in the contact zone, the temperature being insufficient to cause a chemical alteration in the high molecular compounds and the pressure being sufficient to prevent the formation of a substantially large amount of a gas phase, thereby forming a light liquid phase and a heavier phase, and withdrawing said phases at different points in the contact zone.

11. The process according to claim 10 in which the withdrawn light liquid phase is treated to remove therefrom at least a portion of the treating agent, and a portion of the resulting treated light liquid phase is recycled to the contact zone near the point of the withdrawal of the light liquid phase.

12. The process according to claim 10 in which at least a portion of a heavier phase withdrawn from the contact zone is contacted with a similar low molecular treating agent under para-critical conditions to produce secondary light and heavy non-gaseous phases.

13. A continuous process for separating a high molecular mixture containing high molecular compounds containing at least one member of the class consisting of ester type fats, oils and waxes into portions having different properties, comprising introducing said mixture into a countercurrent contact zone at an intermediate point thereof, flowing a liquid low molecular treating agent countercurrently to said mixture through said contact zone at an increasing temperature, said treating agent, in its para-critical state, being non-reactive with said mixture and capable of dissolving a component of the mixture and precipitating another component of the mixture, the temperature at at least one point of said zone being sufficient to cause the treating agent to be in its para-critical state but insufficient to cause chemical alteration in the high molecular compounds, and the pressure being sufficient to prevent the formation of a substantial amount of a gas phase, thereby forming a light liquid phase and a heavier phase, withdrawing said phases near opposite ends of the contact zone, removing at least a portion of the treating agent from the withdrawn light liquid phase, and returning a portion of the high molecular substances thus obtained from the withdrawn light liquid phase to the contact zone near the point of withdrawal of the light liquid phase.

ALBERT SCHAAFSMA.

CERTIFICATE OF CORRECTION.

Patent No. 2,118,454. May 24, 1938.

ALBERT SCHAAFSMA.

It is hereby certified that error appears in the printed specification of the above numbered patent requiring correction as follows: Page 4, first column, lines 22 and 27, for the word "volatilized" read voltolized; line 54, for "Volatilized" read Voltolized; and that the said Letters Patent should be read with this correction therein that the same may conform to the record of the case in the Patent Office.

Signed and sealed this 26th day of March, A. D. 1940.

(Seal)

Henry Van Arsdale,
Acting Commissioner of Patents.

tation of a part of the soluble portion dissolved therein and the formation of a second light liquid phase and a second heavier phase, and separating the second phases, the pressure being not substantially less than the vapor pressure of the liquid phase.

7. The process according to claim 6 in which the initial mixture contains a polymerized oil of the glyceride type.

8. A process for separating a high molecular mixture containing high molecular compounds containing at least one member of the class consisting of ester type fats, oils and waxes into portions having different properties, comprising the steps of dissolving said mixture in a quantity of a liquid low molecular treating agent to produce a first liquid phase, said treating agent being non-reactive with said mixture and capable of dissolving a component of the mixture when the treating agent is in its para-critical state and precipitating another component, heating said liquid phase to a temperature at which the high molecular compounds are not chemically altered and at which the treating agent is in its para-critical state, thereby precipitating a portion of the dissolved mixture and forming a secondary light liquid phase and a secondary heavier phase, separating the secondary phases, further heating the separated lighter secondary phase to cause the precipitation of a portion of the high molecular mixture dissolved therein and the formation of a tertiary light liquid phase and a tertiary heavier phase, and separating the tertiary phases, the pressure being not substantially less than the vapor pressure of the liquid phase.

9. The process according to claim 8 in which the heating is carried out continuously and the precipitated phase is continuously removed from the liquid phase during the heating.

10. A continuous process for separating a high molecular mixture containing high molecular compounds containing at least one member of the class consisting of ester type fats, oils and waxes, into portions having different properties, comprising the steps of flowing said mixture through a contact zone countercurrently to a liquid low molecular treating agent which, in its para-critical state, is non-reactive with said mixture and capable of dissolving a component of the mixture and precipitating another component thereof, increasing the temperature of said treating agent in its direction of flow, the treating agent being in its para-critical state at at least one point in the contact zone, the temperature being insufficient to cause a chemical alteration in the high molecular compounds and the pressure being sufficient to prevent the formation of a substantially large amount of a gas phase, thereby forming a light liquid phase and a heavier phase, and withdrawing said phases at different points in the contact zone.

11. The process according to claim 10 in which the withdrawn light liquid phase is treated to remove therefrom at least a portion of the treating agent, and a portion of the resulting treated light liquid phase is recycled to the contact zone near the point of the withdrawal of the light liquid phase.

12. The process according to claim 10 in which at least a portion of a heavier phase withdrawn from the contact zone is contacted with a similar low molecular treating agent under para-critical conditions to produce secondary light and heavy non-gaseous phases.

13. A continuous process for separating a high molecular mixture containing high molecular compounds containing at least one member of the class consisting of ester type fats, oils and waxes into portions having different properties, comprising introducing said mixture into a countercurrent contact zone at an intermediate point thereof, flowing a liquid low molecular treating agent countercurrently to said mixture through said contact zone at an increasing temperature, said treating agent, in its para-critical state, being non-reactive with said mixture and capable of dissolving a component of the mixture and precipitating another component of the mixture, the temperature at at least one point of said zone being sufficient to cause the treating agent to be in its para-critical state but insufficient to cause chemical alteration in the high molecular compounds, and the pressure being sufficient to prevent the formation of a substantial amount of a gas phase, thereby forming a light liquid phase and a heavier phase, withdrawing said phases near opposite ends of the contact zone, removing at least a portion of the treating agent from the withdrawn light liquid phase, and returning a portion of the high molecular substances thus obtained from the withdrawn light liquid phase to the contact zone near the point of withdrawal of the light liquid phase.

ALBERT SCHAAFSMA.

CERTIFICATE OF CORRECTION.

Patent No. 2,118,454.

May 24, 1938.

ALBERT SCHAAFSMA.

It is hereby certified that error appears in the printed specification of the above numbered patent requiring correction as follows: Page 4, first column, lines 22 and 27, for the word "volatilized" read voltolized; line 54, for "Volatilized" read Voltolized; and that the said Letters Patent should be read with this correction therein that the same may conform to the record of the case in the Patent Office.

Signed and sealed this 26th day of March, A. D. 1940.

(Seal)

Henry Van Arsdale,
Acting Commissioner of Patents.

CERTIFICATE OF CORRECTION.

Patent No. 2,118,454.   May 24, 1938.

ALBERT SCHAAFSMA.

It is hereby certified that error appears in the printed specification of the above numbered patent requiring correction as follows: Page 4, first column, lines 22 and 27, for the word "volatilized" read voltolized; line 54, for "Volatilized" read Voltolized; and that the said Letters Patent should be read with this correction therein that the same may conform to the record of the case in the Patent Office.

Signed and sealed this 26th day of March, A. D. 1940.

Henry Van Arsdale,
Acting Commissioner of Patents.

(Seal)